United States Patent [19]

Obrecht et al.

[11] Patent Number: 5,395,891

[45] Date of Patent: Mar. 7, 1995

[54] RUBBER MIXTURES CONTAINING POLYBUTADIENE GEL

[75] Inventors: Werner Obrecht, Moers; Peter Wendling, Leverkusen; Robert H. Schuster; Andreas Bischoff, both of Hanover, all of Germany

[73] Assignee: Bayer Aktiengesellschaft, Leverkusen, Germany

[21] Appl. No.: 75,618

[22] Filed: Jun. 14, 1993

[30] Foreign Application Priority Data

Jun. 24, 1992 [DE] Germany .............. 42 20 563.8

[51] Int. Cl.6 .................. C08L 7/00; C08L 9/00; C08L 9/10; C08C 1/00
[52] U.S. Cl. .................. 525/194; 525/237; 525/236; 525/233; 525/226; 525/225; 525/193
[58] Field of Search .............. 525/236, 237, 225, 226, 525/194, 193, 233

[56] References Cited

U.S. PATENT DOCUMENTS

| | | | |
|---|---|---|---|
| 2,877,200 | 3/1959 | Carpenter | 525/315 |
| 3,083,175 | 3/1963 | Safford et al. | 525/236 |
| 3,402,220 | 9/1968 | Bierman et al. | 525/236 |
| 3,700,757 | 10/1972 | Heij et al. | 525/236 |
| 4,035,446 | 7/1977 | Hoff | 525/226 |
| 4,046,834 | 9/1977 | Lee et al. | 525/236 |
| 4,192,366 | 3/1980 | Scriver et al. | 525/236 |
| 4,259,218 | 3/1981 | Haws | 525/236 |
| 4,621,118 | 11/1986 | Schloman et al. | 525/236 |
| 4,826,911 | 5/1989 | Suzuki et al. | 525/236 |

FOREIGN PATENT DOCUMENTS

| | | |
|---|---|---|
| 0361667 | 4/1990 | European Pat. Off. . |
| 0450983 | 10/1991 | European Pat. Off. . |
| 55-144039 | 11/1980 | Japan .................. 525/236 |
| 56-024122 | 3/1981 | Japan .................. 525/236 |
| 1078400 | 8/1967 | United Kingdom . |

OTHER PUBLICATIONS

Flory—Principles of Polymer Chemistry—1953 pp. 260–261.

Primary Examiner—Carman J. Seccuro, Jr.
Attorney, Agent, or Firm—Connolly & Hutz

[57] ABSTRACT

Mixtures of A) polybutadiene gel and B) other rubbers containing C=C double bonds, the quantity of polybutadiene gel A), based on the sum of A)+B), being 1 to 70% by weight, show as vulcanizates a favorable combination of the properties hysteresis loss and abrasion resistance.

6 Claims, No Drawings

RUBBER MIXTURES CONTAINING POLYBUTADIENE GEL

This invention relates to mixtures of rubbers containing C=C double bonds and polybutadiene gel (BR gels) and to vulcanizates produced from these mixtures. The vulcanizates show a favorable combination of the properties hysteresis loss and abrasion resistance.

In rubber technology, the expression "hysteresis loss" is understood to be the amount of energy which is irreversibly converted into heat when the elastomer is subjected to dynamic stressing. The measured quantity for hysteresis losses is the tan δ which is defined as the ratio of loss modulus to storage modulus, cf. for example DIN 53 513 and DIN 53 535. Reducing the tan δ in the applicationally important temperature/frequency or amplitude ranges leads, for example, to reduced heat buildup in the elastomer. Tire treads of rubber vulcanizate having a reduced hysteresis loss are distinguished by reduced rolling resistance and, hence, by lower fuel consumption of the vehicles fitted with corresponding tires. The abrasion resistance is a measure of the useful life of a tire tread.

Despite the various types of rubber available for the production of vehicle tires, the attention of experts has been directed above all to natural rubber (NR), cis-polybutadiene (BR) and styrene/butadiene copolymers (SBR). These rubbers or their mixtures are used worldwide for tire manufacture.

Numerous attempts to reduce the rolling resistance of tire treads have been reported in the literature. One way which has been described lies in mixtures of rubbers containing C=C double bonds and sulfur-modified polychloroprene gel (EP 405 216). However, disadvantages of using CR gel lie in the price of the rubber and in the ecological problems involved in the recycling of old tires on account of the chlorine-containing component.

The problem addressed by the present invention was to provide rubber mixtures which could be processed to vulcanizates having a low rolling resistance—expressed as a low hysteresis loos (tan δ)—and minimum abrasion. and which would avoid the above-mentioned disadvantages of using CR gel.

It has now surprisingly been found that rubber mixtures containing polybutadiene gel satisfy these requirements.

Accordingly, the present invention relates to mixtures of
A) polybutadiene gel and
B) other rubbers containing C=C double bonds,
the quantity of polybutadiene gel A), based on the sum of A)+B), being 1 to 70% by weight and preferably 3 to 50% by weight.

The swelling index ($Q_i$) of suitable polybutadiene gels A, hereinafter referred to as BR gel A, in toluene is 1 to 90 and preferably 1 to 50 and is calculated from the content of toluene ($m_T$) remaining in the gel (after centrifugation at 500,000 m/sec.$^2$) and the dry weight of the gel ($m_{gel}$):

$$Q_i = \frac{m_T}{m_{gel}}$$

To this end, 150 mg of the BR gel A are left standing for 16 hours in 20 ml toluene and then shaken for 2 hours. The gel is removed by centrifugation and is weighed moist, dried at 70° C. to constant weight and reweighed.

The polybutadiene gel A is produced by emulsion polymerization (see, for example, M. Morton, P. P. Salatiello, H. Landfield, J. Polym. Sci. 8,2 (1952), 215-224; P. A. Weerts, J. L. M. van der Loos, A. L. German, Makromol. Chem. 190 (1989), 777-788).

The size of the latex particles (DVN value according to DIN 53 206) is preferably 30 to 500 nm.

Crosslinking to the gel may be carried out both during and also after the polymerization. Crosslinking does not by any means have to be complete and even small soluble BR components (for example 20% by weight) resulting from the method of production are acceptable.

Crosslinking during polymerization may be effected by polymerization to high conversions or—in the case of monomer inflow processes—by polymerization at high internal conversions. Crosslinking of the polybutadiene may also be achieved by copolymerization of crosslinking multifunctional compounds. Preferred crosslinking multifunctional co-monomers are compounds containing at least 2 and preferably 2 or 3 co-polymerizable C=C double bonds such as, for example, diisopropenyl benzene, divinyl benzene, divinyl ether, divinyl sulfone, diallyl phthalate, triallyl cyanurate, triallyl isocyanurate, 1,2-polybutadiene, N,N'-m-phenylene dimaleic imide, triallyl trimellitate and also the acrylates and methacrylates of polyhydric, preferably dihydric to tetrahydric, $C_{2-10}$ alcohols, for example of ethylene glycol, propane-1,2-diol, propane-1,3-diol, butane-1,4-diol, hexane-1,6-diol, polyethylene glycol containing 2 to 20 and preferably 2 to 4 oxyethylene units, trimethylol ethane and propane, tetramethylol methane.

Production by polymerization in the absence of regulators is also possible.

Crosslinking after polymerization may be carried out, for example, in the latex stage (in the absence of unreacted monomer) with organic peroxides under elevated pressure and at temperatures of 140° to 170° C. (Houben-Weyl, Methoden der organischen Chemie, 4th Edition, Vol. 14/2, page 848, Eugen Müller (ed.), G. Thieme-Verlag, Stuttgart, 1963).

Preferred rubbers B) contain C=C double bonds corresponding to iodine values of at least 2 and preferably 5 to 470. The iodine values are generally determined by addition of iodine chloride in glacial acetic acid by Wijs' method, DIN 53 241, Part 1. The iodine value defines the quantity of iodine in grams which is chemically bound by 100 g substance.

The rubbers B) include inter alia EPDM, butyl rubber, nitrile rubber, hydrogenated nitrile rubber, natural rubber, polyisoprene, polybutadiene and styrene/butadiene copolymers (SBR) and also mixtures thereof.

The rubbers B) generally have Mooney viscosities (DIN 53 523) in the range from 10 to 150 and preferably in the range from 25 to 80 (ML 1+4)/100° C.

The abbreviation "EPDM" stands for ethylene/propylene/diene terpolymers. EPDMs include rubbers in which the ratio by weight of ethylene to propylene units is in the range from 40:60 to 65:35 and which may contain from 1 to 20 C=C double bonds/1,000 carbon atoms. Suitable diene monomers in the EPDM are, for example, conjugated dienes, for example isoprene and 1,3-butadiene, and unconjugated dienes containing 5 to 25 carbon atoms, for example 1,4-pentadiene, 1,4-hexadiene, 1,5-hexadiene, 2,5-dimethyl-1,5hexadiene and 1,4-octadiene; cyclic dienes, for example cyclopentadiene, cyclohexadiene, cyclooctadiene and dicyclopentadiene; alkylidene and alkenyl norbornenes, for example 5-ethylidene-2-norbornene, 5-butylidene-2-norbornene, 2-methallyl-5-norbornene, 2-isopropenyl-5-norbornene and tricyclodienes.

The unconjugated dienes 1,5-hexadiene, ethylidene norbornene and dicyclopentadiene are preferred. The diene content in the EPDM is preferably 0.5 to 10% by weight, based on EPDM.

EPDM rubbers of the type in question are described, for example, in DE-OS 2 808 709.

The expression "butyl rubber" in the context of the invention encompasses isobutene copolymers of 95 to 99.5% by weight and preferably 97.5 to 99.5% by weight isobutene and 0.5 to 5% by weight and preferably 0.5 to 2.5% by weight copolymerizable diene, such as for example butadiene, dimethyl butadiene, 1,3-pentadiene, more particularly isoprene. On an industrial scale, butyl rubber is produced almost exclusively as isobutene/isoprene copolymer by cationic solution polymerization at low-temperatures; cf. for example Kirk-Othmer, Encyclopedia of Chemical Technology, 2nd ed., Vol. 7, page 688, Interscience Publ., New York/London/Sydney, 1965 and Winnacker-Küchler, Chemische Technologie, 4th Edition, Vol. 6, pages 550–555, Carl Hanser Verlag, München/Wien, 1962. The expression "butyl rubber" also stands for halogenated butyl rubbers.

The expression "nitrile rubber" stands for butadiene/acrylonitrile copolymers containing 5 to 60% by weight and preferably 10 to 50% by weight copolymerizable acrylonitrile. "Hydrogenated" in this context means that 90 to 98.5 and preferably 95 to 98% of the hydrogenatable C=C double bonds are hydrogenated while the C≡N triple bonds of the nitrile groups are not hydrogenated. The hydrogenation of nitrile rubber is known; U.S. Pat. No. 3,700,637, DE-OS 25 39 132, 30 46 008, 30 46 251, 32 27 650, 33 29 974, EP-A 111 412, FR-PS 2 540 503.

Preferred styrene/butadiene copolymers are those containing 18 to 60% by weight and preferably 20 to 50% by weight copolymerized styrene. Solution and emulsion polymers are particularly preferred.

Fillers of any type may of course be added to the rubber mixtures according to the invention. Preferred fillers are carbon blacks. Preferred carbon blacks have surfaces of 35 to 200 m²/g (CTAB determination). Particularly preferred carbon blacks are SAF, HAF, FEF, ISAF and SRF carbon blacks and mixtures thereof. Mixtures of carbon blacks with silicas (with and without filler activators) and silicas which have particule sizes and surfaces comparable with those of carbon blacks, are also suitable as fillers. The filler content may vary within wide ranges, but is often between 30 and 80 parts by weight filler per 100 parts by weight rubber (A+B).

The mixtures according to the invention may be produced in various ways. Firstly, the solid individual components may of course be mixed together. Units suitable for this purpose are, for example, rollers and internal mixers. However, mixing by combining the latices of the individual rubbers is also suitable. The mixtures according to the invention thus produced may be isolated in the usual way by concentration through evaporation, precipitation or low-temperature coagulation (cf. U.S. Pat. No. 2,187,146). By incorporation of fillers in the latex mixtures and subsequent working up, the mixtures according to the invention may be directly obtained as rubber/filler formulations. Accordingly, the present invention also relates to a process for the production of the described mixtures by combining the components.

To obtain desired crude mixture or vulcanizate properties, the usual processing aids, plasticizers, antiagers, factices and resins may be added to the mixtures according to the invention.

Suitable crosslinking systems are any of the known systems used in rubber technology, such as sulfur crosslinking, peroxide crosslinking, urethane crosslinking, metal oxide crosslinking, resin crosslinking, radiation crosslinking and combinations thereof. Preferred crosslinking systems are determined by the rubbers B used in the mixtures according to the invention, sulfur crosslinking systems being particularly preferred.

The present invention also relates to the vulcanizates produced from the described mixtures.

The vulcanizates of the mixtures according to the invention show reduced hysteresis losses and high abrasion resistance and are therefore eminently suitable for the production of tires.

The following Examples are intended to illustrate the invention without limiting it in any way.

EXAMPLES

1. Preparation of the BR Gels

The starting latex for the BR gels A to A 5 was Butadiene Latex 2004 (a product of Bayer Eastomères, Lillebonne, France).

BR gel A

To isolate the rubber (BR gel A), 100 ml latex were added dropwise with intensive stirring to 200 ml 0.01 molar aqueous aluminium sulfate solution. The coagulate was filtered off and then washed first with 1 liter demineralized water and then with 1 liter acetone.

The rubber thus treated was dried to constant weight in a vacuum oven at a temperature of 50° C.

BR gel A 1

The latex on which BR gel A was based was introduced into a 150 ml laboratory autoclave equipped with a temperature-controlled heating jacket and 0.16% by weight dicumyl peroxide, based on the rubber, was subsequently introduced.

The autoclave was closed and placed under a nitrogen pressure of 8 bar. The mixture was then heated with stirring to 60° C. and stirred at that temperature for 2 hours. It was then heated to 150° C. and stirred at that temperature for 45 minutes. The mixture was then cooled to room temperature, the latex was removed and coagulated to isolate the rubber. The rubber was isolated in the same way as described for BR gel A.

BR gel A 2

Preparation was carried out in the same way as described for BR gel A 1. The latex on which BR gel A was based and 0.32% by weight dicumyl peroxide, based on rubber, were used.

BR gel A 3

Preparation was carried out in the same was as described for BR gel A 1. The latex on which BR gel A was based and 0.48% by weight dicumyl peroxide, based on rubber, were used.

BR gel A 4

Preparation was carried out in the same was as described for BR gel A 1. The latex on which BR gel A was based and 0.64% by weight dicumyl peroxide, based on rubber, were used.

BR gel A 5

Preparation was carried out in the same was as described for BR gel A 1. The latex on which BR gel A was based and 0.80% by weight dicumyl peroxide, based on rubber, were used.

Preparation of the Starting Latex for BR Gel B

The aqueous phase consisting of 153.5 parts by weight demineralized water, 5.0 parts by weight disproportionated resinic acid 70%, Na salt) and 13 parts by weight 1N sodium hydroxide were introduced into a 250 liter tank and purged with nitrogen. After the addition of 0.3 part by weight n-dodecyl mercaptan, the tank was evacuated twice and purged with nitrogen. 100 Parts by weight butadiene were then added, the emulsion was heated with stirring to 60° C. and, after this temperature had been reached, polymerization was initiated by addition of an aqueous solution consisting of 0.23 part by weight potassium peroxodisulfate and 10 parts by weight demineralized water.

After polymerization had been initiated, the temperature was adjusted to 55° C. and polymerization was continued for 31 hours to a monomer conversion of 99.9%. The polymerization mixture was cooled to room temperature and the unreacted monomer was removed by stirring in vacuo.

BR Gel B

Preparation was carried out in the same way as described for BR gel A 1. The starting latex and 0.64% by weight dicumyl peroxide, based on rubber, were used.

The following Table provides an overview of the BR gels prepared:

TABLE 1

| | Particle size* of the starting latex (nm) | Gel characteristics | |
|---|---|---|---|
| | | Gel content (%) | Swelling index in toluene |
| Starting latex for | | | |
| BR gels A to A5 | 281 | | |
| BR gel A | | 80 | 18 |
| BR gel A 1 | | 96 | 17 |
| BR gel A 2 | | >99 | 12 |
| BR gel A 3 | | >99 | 10 |
| BR gel A 4 | | >99 | 7 |
| BR gel A 5 | | >99 | 8 |
| Starting latex for | | | |
| BR gel B | 98 | | |
| BR gel B | | <99 | 2.5 |

*DVN value according to DIN 53 206, see also H.G. Müller, Colloid Polym. Sci. 267, pages 1113 to 1116 (1989).

2. Preparation of the Test Mixtures

Test Mixture 1

The test mixture had the following composition:

80 parts by weight NR[1]
20 parts by weight BR gel (see Table 2)
3.0 parts by weight TMTD[2]
3.0 parts by weight ZnO[3]

The individual components were mixed in a 60 ml measuring kneader equipped with roller rotors (Haake Rheocord System 40). The mixing time was 15 minutes and the mixing temperature 50° C. The components were added in the order NR, BR gel, ZnO and TMTD.

Vulcanization of the final mixture was carried out in a laboratory press (Wickert & Söhne WLP 63/3,5/3) at a temperature of 150° C. and under a pressure of 150 bar. The vulcanization time was the $t_{90}$ value determined at 150° C. in a shear viscosimeter (DIN 53 529) plus 2 minutes. $t_{90}$ is the time in which 90% of the conversion measurable in a Vulkameter is reached. Plates measuring 80×180 nm for a thickness of 2 mm were obtained in the laboratory press.

Test Mixture 2

Test mixture 2 had the following composition:

| 80 parts by weight NR[1] | |
|---|---|
| parts by weight BR gel | Variable, |
| parts by weight CB10[4] | see Tables |
| parts by weight carbon black N 330[5] or N 772[6] | 3 to 9 |
| parts by weight TMTD[2] | |
| Parts by weight ZnO[3] | |

[1]Natural rubber SMR CV 50 (a product of Weber & Schaer, Hamburg), rubber content 61.2%)
[2]Vulkacit TMTD, tetramethyl thiuram disulfide, a product of Bayer AG
[3]ZnO—RS, a product of Zinkweiß-Forschungsgesellschaft mbH (zinc oxide)
[4]CB 10, a product of Bayer AG (cobalt/polybutadiene with a cis content of 96%
[5]Ruß N 330, a product of Degussa/Hanau
[6]Ruß N 772, a product of Degussa/Hanau The individual components were mixed on Troester WNU 1 laboratory mixing rollers (diameter 100 mm, length 250 mm). The mixing time was 30 minutes and the mixing temperature 50° C. The components were added in the order NR, BR gel, carbon black, ZnO and TMTD.

The final mixture was vulcanized in the same was as test mixture 1.

Performance Properties

Various data were determined on the vulcanizates of the Examples and Comparison Examples obtained from test mixtures 1 and 2:

| Abbreviation | Meaning | Method of determination |
|---|---|---|
| F | Tensile strength | DIN 53 504 |
| D | Elongation at break (%) | DIN 53 504 |
| M 100 | Modulus at 100% elongation (MPa) | DIN 53 504 |
| M 200 | Modulus at 200% elongation (MPa) | DIN 53 504 |
| M 300 | Modulus at 300% elongation (MPa) | DIN 53 504 |
| M 500 | Modulus at 500% elongation (MPa) | DIN 53 504 |
| E 23 | Elasticity at 23° C. (%) | DIN 53 512 |
| Shore A | Hardness | DIN 53 505 |
| ABR | Abrasion on emery paper, thickness 60 | DIN 53 516 |
| tan δ (20) | Tangent δ at 20° C., 0.5% amplitude 1Hz, initial force 200 g | Torsion measurement mechanical/ dynamic analyzer |
| tan δ (70) | Tangent δ at 70° C., 0.5% amplitude 1Hz, initial force 200 g | |
| tan δ (100) | Tangent δ at 100° C., 0.5% amplitude 1Hz, initial force 200 g | Rheometrics RDA 700 |
| G* (20) | Complex elasticity modulus at 20° C. | Torsion measurement mechanical/dynamic analyzer |
| G* (70) | Complex elasticity modulus at 70° C. | |
| G* (100) | Complex elasticity modulus at 100° C. | Rheometrics RDA 700 |

The entire set of data was not determined on all vulcanizates.

Series 1

In this series, it is intended in principle to show that the degree of crosslinking of the BR gel has an effect on the vulcanizate properties of the rubber mixtures according to the invention. The results of series 1 are set out in Table 2.

The data obtained with test mixture 1 show that Examples 1 to 6 according to the invention are characterized by a more favorable combination of the properties hysteresis loss and abrasion than the vulcanizate based on NR (Comparison Example 1). Abrasion decreases with increasing degree of crosslinking of the BR gels (Examples 1 to 3) and subsequently levels off onto a plateau (Examples 4 to 6). The same also applies to the hysteresis loss (tan δ), Examples 3, 4 and 5 representing an optimum.

Series 2

In series 2, (see Table 3) it is shown that the vulcanizate of Example 7 according to the invention is superior both to a vulcanizate produced from NR and to a vulcanizate produced from an NR/BR blend (Comparison Examples 2 and 3) in the combination of the properties hysteresis loss (tan δ) and abrasion for a comparable modulus value M 200. Comparison Example 2 shows a distinctly higher hysteresis loss and abrasion than Example 7. Although, as in Example 7 low abrasion is obtained in Comparison Example 3, the hysteresis loss is distinctly higher than in Example 7 according to the invention.

Series 3

The results of series 3 (see Table 3) show that, even where a small quantity of BR gel is used in the rubber mixture according to the invention, the advantage afforded by the invention can clearly be seen. For comparable modulus M 200 and abrasion, Example 8 according to the invention shows a lower hysteresis loss than an NR vulcanizate (Comparison Example 4).

Series 4

In Example 9 according to the invention, the BR gel used in the rubber mixture (BR gel A 4) had been prepared from a latex having a larger particle diameter than was the case with the Examples according to the invention of series 2 and 3.

Example 9 according to the invention is also superior to an NR vulcanizate (Comparison Example 2) in the combination of the properties hysteresis loss (tan δ) and abrasion for a comparable modulus M 200 value (see Table 4).

Series 5

The BR gel used in Example 10 according to the invention was the same BR gel used as in the Example 9 of series 4, but is used in a smaller quantity. For a comparable modulus M 200 value, Example 10 according to the invention show a slightly higher abrasion than Comparison Example 4, but a lower hysteresis loss (see Table 4).

Series 6

Series 6 (see Table 5) is intended to show that the advantages of the rubber mixtures according to the invention are also in evidence where a less active carbon black (N 772) is used. For a comparable modulus M 200 value, Example 11 according to the invention shows a better combination of the properties hysteresis loss (tan δ) and abrasion than an NR/BR blend (Comparison Example 5).

Series 7

Series 7 (see Table 6) shows that the system of the rubber mixtures according to the invention is flexible. The percentage content of BR gel in the rubber mixture (Examples 7 and 12 according to the invention) can be varied without any effect on the advantages in respect to hysteresis loss (tan δ) and abrasion. Examples 7 and 12 according to the invention are superior to an NR vulcanizate (Comparison Example 2). Comparison Example 3 was vulcanised to a similar modulus M 200 and has a similar low abrasion, but fails to exihibit the advantageous low hysteresis loss (tan δ) of the Examples 7 and 12 according to the invention.

Series 8

The results of series 8 (see Table 7) show that the system of the rubber-mixtures according to the invention can be varied in respect to the degree of crosslinking of the BR gel used, even in the case of mixtures filled with carbon black. Both the use of BR gel having a low degree of crosslinking (Example 13) and the use of BR gel having a relatively high degree of crosslinking (Example 9) lead to vulcanizates which have a more favorable combination of the properties hysteresis loss (tan δ) and abrasion resistance than an NR vulcanizate (Comparison Example 2).

Series 9

Series 9 (see Table 8) shows that, although higher degrees of crosslinking of the NR (variation of the quantity of accelerator, Comparison Examples 2, 6, 7 and 8) lead to more favorable hysteresis losses (tan δ), they do not lead a simultaneous reduction in abrasion. Example 7 according to the invention is superior to Comparison Examples 2, 6, 7 and 8 both in respect to the hysteresis loss and in respect to abrasion resistance.

Series 10

Series 10 (see Table 9) shows that an increase in the quantity of carbon black does not lead to NR vulcanizates (Comparison Examples 2, 9, 10 and 11) which have the favorable properties (tan δ and abrasion) of Example 7 according to the invention.

TABLE 2

Preparation and properties of Examples 1 to 6 according to the invention and Comparison Example 1

| | Rubber mixture (parts by weight) | Test mixture | Performance properties | | | | | |
|---|---|---|---|---|---|---|---|---|
| | | | F | D | M300 | E 23 | ABR[1] | tan δ (20) |
| Ex. 1 | 80 NR 20 BR gel A | 1 | 15.2 | 670 | 1.3 | 65.8 | 72 | 0.037 |
| Ex. 2 | 80 NR 20 BR gel A 1 | 1 | 16.8 | 662 | 1.4 | 66.4 | 71 | 0.036 |
| Ex. 3 | 80 NR 20 BR gel A 2 | 1 | 18.4 | 655 | 1.6 | 67.2 | 56 | 0.032 |
| Ex. 4 | 80 NR 20 BR gel A 3 | 1 | 18.9 | 615 | 2.0 | 67.6 | 51 | 0.031 |
| Ex. 5 | 80 NR 20 BR gel A 4 | 1 | 18.6 | 610 | 2.3 | 68.4 | 49 | 0.030 |
| Ex. 6 | 80 NR 20 BR gel A 5 | 1 | 17.6 | 610 | 2.3 | 67.6 | 51 | 0.034 |
| Comp. Ex. 1 | 80 NR 0 BR gel | 1 | 16.0 | 700 | 1.2 | 67.4 | 74 | 0.037 |

[1] In this series, abrasion was determined with 5N applied force in contrast to DIN 53 616

TABLE 3

Preparation and properties of Examples 7 and 8 according to the invention and Comparison Examples 2, 3 and 4 (test mixture 2)

| | Series 2 | | | Series 3 | |
|---|---|---|---|---|---|
| | | Comparison Examples | | | Comparison |
| | Ex. 7 | 2 | 3 | Ex. 8 | Example 4 |
| NR (Parts by weight) | 80 | 80 | 80 | 80 | 80 |
| BR gel B | 20 | — | — | 10 | — |

TABLE 3-continued

Preparation and properties of Examples 7 and 8 according to the invention and Comparison Examples 2, 3 and 4 (test mixture 2)

|  | Series 2 | | | Series 3 | |
|---|---|---|---|---|---|
|  |  | Comparison Examples | | | Comparison |
|  | Ex. 7 | 2 | 3 | Ex. 8 | Example 4 |
| (parts by weight) | | | | | |
| CB 10 | — | — | 20 | — | — |
| (parts by weight) | | | | | |
| Ruβ N 330 - carbon black | 50 | 50 | 63 | 67 | 67 |
| (parts by weight) | | | | | |
| TMTD | 3.0 | 3.0 | 3.5 | 3.0 | 3.0 |
| ZnO | 3.0 | 3.0 | 3.5 | 3.0 | 3.0 |
| (parts by weight) | | | | | |
| M 200 | 10.9 | 10.7 | 10.8 | 15.8 | 15.9 |
| ABR | 76 | 104 | 70 | 107 | 99 |
| Density | 1.114 | 1.148 | 1.140 | 1.176 | 1.198 |
| Shore A | 72.5 | 72.9 | 70.4 | 81.8 | 83.5 |
| E 23 | 49.5 | 42.7 | 48.5 | 38.6 | 35.5 |
| tan δ | | | | | |
| (20) | 0.108 | 0.181 | 0.124 | 0.165 | 0.180 |
| (70) | 0.107 | 0.190 | 0.122 | 0.156 | 0.176 |
| (100) | 0.094 | 0.156 | 0.105 | 0.136 | 0.159 |
| G* | | | | | |
| (20) | 10.01 | 10.85 | 9.74 | 19.88 | 23.54 |
| (70) | 7.44 | 6.85 | 6.99 | 12.92 | 14.87 |
| (100) | 6.69 | 5.99 | 6.36 | 11.01 | 12.34 |

TABLE 4

Preparation and properties of Examples 9 and 10 according to the invention and Comparison Examples 2 and 4 (test mixture 2)

|  | Series 4 | | Series 5 | |
|---|---|---|---|---|
|  |  | Comparison |  | Comparison |
|  | Ex. 9 | Example 2 | Ex. 10 | Example 4 |
| NR | 80 | 80 | 80 | 80 |
| (Parts by weight) | | | | |
| BR gel A4 | 20 | — | 10 | — |
| (parts by weight) | | | | |
| Ruβ N 330 - carbon black | 50 | 50 | 67 | 67 |
| (parts by weight) | | | | |
| TMTD | 3.0 | 3.0 | 3.0 | 3.0 |
| ZnO | 3.0 | 3.0 | 3.0 | 3.0 |
| (parts by weight) | | | | |
| M 200 | 10.5 | 10.7 | 14.8 | 15.9 |
| ABR | 99 | 104 | 113 | 99 |
| Density | 1.113 | 1.148 | 1.175 | 1.198 |
| Shore A | 69.5 | 72.9 | 81.3 | 83.5 |
| E 23 | 47.8 | 42.7 | 37.2 | 35.5 |
| tan δ | | | | |
| (20) | 0.138 | 0.181 | 0.163 | 0.180 |
| (70) | 0.139 | 0.190 | 0.156 | 0.176 |
| (100) | 0.126 | 0.156 | 0.137 | 0.159 |
| G* | | | | |
| (20) | 9.64 | 10.85 | 22.03 | 23.54 |
| (70) | 6.94 | 6.85 | 14.67 | 14.87 |
| (100) | 6.17 | 5.99 | 12.38 | 12.34 |

TABLE 5

Preparation and properties of Example 11 according to the invention and Comparison Example 5 (test mixture 2)

|  | Series 2 | |
|---|---|---|
|  | Example 11 | Comparison Example 5 |
| NR | 80 | 80 |
| (Parts by weight) | | |
| BR gel B | 20 | — |
| (parts by weight) | | |
| CB 10 | — | 20 |
| (parts by weight) | | |
| Ruβ N 772 - carbon black | 50 | 65 |
| (parts by weight) | | |
| TMTD | 3.0 | 3.5 |

TABLE 5-continued

Preparation and properties of Example 11 according to the invention and Comparison Example 5 (test mixture 2)

|  | Series 2 | |
|---|---|---|
|  | Example 11 | Comparison Example 5 |
| ZnO | 3.0 | 3.5 |
| (parts by weight) | | |
| M 200 | 8.1 | 7.6 |
| ABR | 140 | 146 |
| Density | 1.121 | 1.158 |
| Shore A | 61.5 | 61.7 |
| E 23 | 58.7 | 56.5 |
| tan δ | | |
| (20) | 0.075 | 0.094 |
| (70) | 0.078 | 0.093 |
| (100) | 0.067 | 0.080 |
| G* | | |
| (20) | 3.84 | 4.38 |
| (70) | 3.07 | 3.45 |
| (100) | 3.06 | 3.41 |

TABLE 6

Preparation and properties of Examples 7 and 12 according to the invention and Comparison Examples 2 and 3 (test mixture 2)

|  | Series 7 | | | |
|---|---|---|---|---|
|  |  |  | Comparison | Comparison |
|  | Ex. 7 | Ex. 12 | Example 2 | Example 3 |
| NR | 80 | 80 | 80 | 80 |
| (Parts by weight) | | | | |
| BR gel B | 20 | 30 | — | — |
| (parts by weight) | | | | |
| CB 10 | — | — | — | 20 |
| (parts by weight) | | | | |
| Ruβ N 330 - carbon black | 50 | 50 | 50 | 63 |
| (parts by weight) | | | | |
| TMTD | 3.0 | 3.0 | 3.0 | 3.5 |
| ZnO | 3.0 | 3.0 | 3.0 | 3.5 |
| (parts by weight) | | | | |
| M 200 | 10.9 | 11.5 | 10.7 | 10.8 |
| ABR | 76 | 83 | 104 | 70 |
| Density | 1.114 | 1.103 | 1.148 | 1.140 |
| Shore A | 72.5 | 72.5 | 72.9 | 70.4 |
| E 23 | 49.5 | 49.2 | 42.7 | 48.5 |
| tan δ | | | | |
| (20) | 0.108 | 0.110 | 0.181 | 0.124 |
| (70) | 0.107 | 0.110 | 0.190 | 0.122 |
| (100) | 0.094 | 0.090 | 0.156 | 0.105 |
| G* | | | | |
| (20) | 10.01 | 9.95 | 10.85 | 9.74 |
| (70) | 7.44 | 7.65 | 6.85 | 6.99 |
| (100) | 6.69 | 6.65 | 5.99 | 6.36 |

TABLE 7

Preparation and properties of Examples 13 and 9 according to the invention and Comparison Example 2 (test mixture 2)

|  | Series 8 | | |
|---|---|---|---|
|  |  |  | Comparison |
|  | Ex. 13 | Ex. 9 | Example 2 |
| NR | 80 | 80 | 80 |
| (Parts by weight) | | | |
| BR gel A | 20 | — | — |
| (parts by weight) | | | |
| BR gel A 4 | — | 20 | — |
| (parts by weight) | | | |
| Ruβ N 330 - carbon black | 50 | 50 | 50 |
| (parts by weight) | | | |
| TMTD | 3.0 | 3.0 | 3.0 |
| ZnO | 3.0 | 3.U | 3.0 |
| (parts by weight) | | | |
| M 200 | 7.4 | 10.5 | 10.7 |
| ABR | 106 | 99 | 104 |
| Density | 1.110 | 1.113 | 1.148 |
| Shore A | 67.4 | 69.5 | 72.9 |
| E 23 | 45.0 | 47.8 | 42.7 |

TABLE 7-continued

Preparation and properties of Examples 13 and 9 according to the invention and Comparison Example 2 (test mixture 2)

|  | Series 8 | | |
|---|---|---|---|
|  | Ex. 13 | Ex. 9 | Comparison Example 2 |
| tan δ |  |  |  |
| (20) | 0.134 | 0.138 | 0.181 |
| (70) | 0.137 | 0.139 | 0.190 |
| (100) | 0.120 | 0.126 | 0.156 |
| G* |  |  |  |
| (20) | 8.74 | 9.64 | 10.85 |
| (70) | 6.23 | 6.94 | 6.85 |
| (100) | 5.49 | 6.17 | 5.99 |

TABLE 8

Preparation and properties of Example 7 according to the invention and Comparison Examples 2, 6, 7 and 8 (test mixture 2)

|  | Series 9 | | | | |
|---|---|---|---|---|---|
|  |  | Comparison Examples | | | |
|  | Ex. 7 | 2 | 6 | 7 | 8 |
| NR (Parts by weight) | 80 | 80 | 80 | 80 | 80 |
| BR gel B (parts by weight) | 20 | — | — | — | — |
| RUβ N 330 - carbon black (parts by weight) | 50 | 50 | 50 | 50 | 50 |
| TMTD | 3.0 | 3.0 | 3.5 | 3.75 | 4.0 |
| ZnO (parts by weight) | 3.0 | 3.0 | 3.5 | 3.75 | 4.0 |
| M 200 | 10.9 | 10.7 | 12.5 | 12.7 | 14.1 |
| ABR | 76 | 104 | 102 | 105 | 103 |
| Density | 1.114 | 1.148 | 1.156 | 1.160 | 1.162 |
| Shore A | 72.5 | 72.9 | 72.2 | 73.1 | 73.7 |
| E 23 | 49.5 | 42.7 | 43.5 | 43.5 | 44.0 |
| tan δ |  |  |  |  |  |
| (20) | 0.108 | 0.181 | 0.149 | 0.145 | 0.125 |
| (70) | 0.107 | 0.190 | 0.152 | 0.137 | 0.117 |
| (100) | 0.094 | 0.156 | 0.134 | 0.120 | 0.108 |
| G* |  |  |  |  |  |
| (20) | 10.01 | 10.85 | 11.30 | 16.30 | 10.65 |
| (70) | 7.44 | 6.85 | 7.54 | 11.90 | 7.61 |
| (100) | 6.69 | 5.99 | 6.70 | 10.30 | 6.79 |

TABLE 9

Preparation and properties of Example 7 according to the invention and Comparison Examples 2, 9, 10 and 11 (test mixture 2)

|  | Series 10 | | | | |
|---|---|---|---|---|---|
|  |  | Comparison Examples | | | |
|  | Ex. 7 | 2 | 9 | 10 | 11 |
| NR (Parts by weight) | 80 | 80 | 80 | 80 | 80 |
| BR gel B (parts by weight) | 20 | — | — | — | — |
| RUβ N 330 - carbon black | 50 | 50 | 54 | 67 | 85 |
| (parts by weight) |  |  |  |  |  |
| TMTD | 3.0 | 3.0 | 3.0 | 3.0 | 3.0 |
| ZnO | 3.0 | 3.0 | 3.0 | 3.0 | 3.0 |
| (parts by weight) |  |  |  |  |  |
| M 200 | 10.9 | 10.7 | 11.8 | 15.9 | — |
| ABR | 76 | 104 | 95 | 99 | 135 |
| Density | 1.114 | 1.148 | 1.160 | 1.198 | 1.242 |
| Shore A | 72.5 | 72.9 | 74.5 | 83.5 | 91.8 |
| E 23 | 49.5 | 42.7 | 41.1 | 35.5 | 31.8 |
| tan δ |  |  |  |  |  |
| (20) | 0.108 | 0.181 | 0.156 | 0.180 | 0.186 |
| (70) | 0.107 | 0.190 | 0.147 | 0.176 | 0.179 |
| (100) | 0.094 | 0.156 | 0.127 | 0.159 | 0.159 |
| G* |  |  |  |  |  |
| (20) | 10.01 | 10.85 | 13.32 | 23.54 | 39.90 |
| (70) | 7.44 | 6.85 | 8.69 | 14.87 | 20.97 |
| (100) | 6.69 | 5.99 | 7.49 | 12.34 | 16.75 |

We claim:

1. A vulcanizate exhibiting improved hysteresis loss and abrasion resistance properties suitable for production of vehicle tires, the vulcanizate being prepared by crosslinking with a suitable crosslinking system a mixture of:

A) polybutadiene gel which can contain small amounts of soluble components up to about 20% by weight produced by emulsion polymerization in the presence of organic peroxides and optionally cross-linking multifunctional compounds, wherein the crosslinking to form the gel occurs during or after polymerization, the polybutadiene gel having a swelling index in toluene of 1 to 90 and a particle size of 30 to 500 nm; with B) another rubber selected from the group consisting of EPDM, butyl rubber, nitrile rubber, hydrogenated nitrile rubber, natural rubber, polyisoprene, polybutadiene, and styrene/butadiene copolymers, or vulcanizates thereof, said rubber having a Mooney viscosity of 25 to 150;

and wherein the total quantity of polybutadiene gel, based on the sum of A) and B) in the vulcanizate, is 1 to 70% by weight.

2. The vulcanizate of claim 1, wherein the content of polybutadiene gel is 3 to 50% by weight, based on the sum of A) and B).

3. The vulcanizate of claim 1, wherein the content of polybutadiene gel is about 20% by weight, based on the sum of A) and B).

4. The vulcanizate of claim 1, wherein the Mooney viscosity of component B) is 25 to 80.

5. The vulcanizate of claim 1 additionally containing carbon black.

6. The vulcanizate of claim 1 wherein B) is natural rubber.

* * * * *